(12) United States Patent
Bier

(10) Patent No.: US 7,549,656 B2
(45) Date of Patent: Jun. 23, 2009

(54) BALL JOINT FOR STEERING KNUCKLE

(75) Inventor: Matthew Bier, Fresno, CA (US)

(73) Assignee: KW Automotive, North America, Sanger, CA (US)

( * ) Notice: Subject to any disclaimer, the term of this patent is extended or adjusted under 35 U.S.C. 154(b) by 545 days.

(21) Appl. No.: 11/105,774

(22) Filed: Apr. 13, 2005

(65) Prior Publication Data
US 2005/0242539 A1 Nov. 3, 2005

Related U.S. Application Data

(60) Provisional application No. 60/567,034, filed on Apr. 30, 2004.

(51) Int. Cl.
B62D 7/16 (2006.01)
(52) U.S. Cl. .................................. 280/93.511
(58) Field of Classification Search .............. 280/93.51, 280/93.511, 95.512, 124.126, 124.128
See application file for complete search history.

(56) References Cited

U.S. PATENT DOCUMENTS

| 2,227,521 | A |   | 1/1941  | Utz              |           |
|-----------|---|---|---------|------------------|-----------|
| 2,553,743 | A | * | 5/1951  | Booth            | 403/36    |
| 3,749,415 | A |   | 7/1973  | Sampatacos       |           |
| 3,865,394 | A |   | 2/1975  | Epner et al.     |           |
| 4,618,159 | A |   | 10/1986 | Kozyra et al.    |           |
| 4,722,540 | A |   | 2/1988  | Kozyra et al.    |           |
| 4,953,894 | A | * | 9/1990  | Broszat et al.   | 280/93.511|
| 5,022,673 | A |   | 6/1991  | Sekino et al.    |           |
| 5,213,435 | A | * | 5/1993  | Broszat          | 403/122   |
| 5,951,030 | A |   | 9/1999  | Butler           |           |
| 6,179,308 | B1|   | 1/2001  | Mielauskas et al.|           |
| 6,398,240 | B1|   | 6/2002  | Taylor           |           |
| 6,431,569 | B2|   | 8/2002  | Handa            |           |
| 6,729,633 | B1|   | 5/2004  | Irwin            |           |
| 6,783,136 | B2| * | 8/2004  | Pronsias Timoney et al. | 280/93.511 |
| 6,860,498 | B2|   | 3/2005  | McGaughy         |           |

(Continued)

OTHER PUBLICATIONS

Belltech, Installation Instructions for Belltech Model 2102 Lowering Spindle Assembly (10 pages), dated Oct. 2001.

(Continued)

Primary Examiner—Faye M. Fleming
(74) Attorney, Agent, or Firm—Mark D. Miller

(57) ABSTRACT

The present invention is a modified ball joint assembly for attachment to a steering knuckle made up of a body and a spacer. The body includes a ball joint at one end, a set of attachment openings at the other end, and a variably spaced segment between the ends. The spacer inserts into a void in the lower control arm of the vehicle, and includes a plurality of complementary attachment openings for use in attaching the body and the spacer to the lower control arm. The modified ball joint assembly lowers the position of the lower control arm of the vehicle relative to the steering knuckle thereby lowering the ride height of a vehicle a desired amount without requiring the removal of or modification of the steering knuckle. The present invention allows the factory-supplied steering knuckle and tires to be used, providing a considerable cost savings to the end user. The ball joint assembly of the present invention may be used to lower the vehicle chassis on vehicles where the steering knuckles is of the large-bore "live" wheel hubs, including four-wheel drive trucks.

19 Claims, 5 Drawing Sheets

U.S. PATENT DOCUMENTS

2002/0102126 A1* 8/2002 Kincaid et al. .............. 403/133
2003/0099505 A1* 5/2003 Kincaid et al. .............. 403/133

OTHER PUBLICATIONS

Belltech, Flyer from Oct.-Nov. 2001 SEMA trade show illustrating Belltech Model 2102 Lowering Spindle Assembly (1 page).

Belltech, Belltech 2001 Application Guide (20 pages), dated Feb. 2001.

Belltech, Belltech 1997 Sport Truck Products Catalog (35 pages).

Belltech, Belltech 1996 Products Catalog (35 pages).

* cited by examiner

BALL JOINT FOR STEERING KNUCKLE

This application claims the benefit of U.S. Provisional Application No. 60/567,034, filed on Apr. 30, 2004, which is incorporated herein by this reference.

BACKGROUND OF THE INVENTION

1. Field of the Invention

The present invention relates to steering knuckles, and more particularly to a unique ball joint for use on a steering knuckle that lowers the height of a vehicle (i.e., a drop spindle ball joint).

2. Description of the Prior Art

It has become popular to customize vehicles by lowering the height of such vehicles relative to the ground. Lowering vehicles usually improves ride handling and is also done for aesthetic purposes, especially in light trucks. At the front end of the vehicle, lowering has been accomplished by replacing the factory-made (stock) steering knuckle provided with the new vehicle with an alternative after-market steering knuckle that lowers the vehicle height. Such vehicle-lowering steering knuckles are commonly referred to as "drop spindles."

Factory designs for steering knuckles are constantly changing, such that new and different after-market drop spindles must also be designed. Generally speaking, a given steering knuckle is pivotally attached to an upper and lower control arm of the vehicle steering assembly. The pivotal attachments are typically made using ball joints. To lower the vehicle height at the front, it is necessary to lower the positions where the upper and lower control arms connect to the steering knuckles associated with the front wheels. Lowering these connections has the effect of raising the position of the spindle pin or shaft (wheel hub/opening) on the steering knuckle relative to those connections. The lowered control arms (raised spindle/wheel position) result in a lowered vehicle chassis height relative to the wheels.

A typical spindle (or steering knuckle) is a component of the front suspension of a vehicle, which attaches the wheel and brake assemblies to the vehicle, and allows the wheels to travel vertically (joust and rebound), turn, and rotate. The most common spindle bodies are of a cast metal configuration utilizing a press fit, metallic, machined, cylindrical shaft called a spindle pin to which the wheel bearings, brake components, and wheel are affixed. In particular, a wheel hub fits over the elongated spindle pin with bearing surfaces actually making contact with the pin. A vehicle wheel is, in turn, attached to the hub. This common type of pin and hub assembly is sometimes referred to in the industry as a "dead hub."

In the past, drop spindles have been developed in which the position of the spindle pin shaft has been vertically changed relative to the steering knuckle body, thereby raising the position of the vehicle wheels relative to the chassis which lowers the chassis closer to the ground. This is possible because most drop spindle bodies are large enough that there is considerable space within the body, often several inches, where the position of the elongated spindle pin can be established without affecting performance.

For a variety of reasons, the manufacturers of several light trucks have recently changed the design of the steering knuckles used on these vehicles to accommodate a different kind of wheel hub assembly. The new hub assemblies are bolt-in"live" spindle hubs to which the brake and wheel assemblies are attached. The term"live" hub implies that the hub assembly, to which the brake and wheel assemblies are attached, is made up of a short shaft that rotates within, and is affixed to roller bearings that are mounted within the hub bearing housing. The hub bearing housing, in turn, is attached into the spindle body. Significantly, the bolt-in "live" hub assembly requires a much larger bore diameter to be placed within the steering knuckle body, than that previously required for a press-fit spindle pin. In addition, the bolts that attach the hub assembly to the spindle body have a set pattern which must be accommodated for. The large bore and the bolt-pattern require much more space than the press-in spindle pin designs. These differences in the design of these recent factory steering knuckles have taken away virtually all of the space previously available to accomplish the vehicle lowering function using existing drop spindle designs. Accordingly, late model trucks are unable to be lowered by traditional drop spindles.

In response the new hub assemblies design, drop spindles having inverted ball joint assemblies have been introduced to the market, such as that described in U.S. Pat. No. 6,398,240. U.S. Pat. No. 6,860,498 discloses a steering knuckle for use on a live axle application. As stated above, this, like other drop spindles on live axles succumbs to the problem of a limited capability to lower the vehicle. In addition, the disassembly, removal and replacement of the steering knuckle of the vehicle are burdensome. Such removal often requires the disassembly, removal and replacement of brake system, brake lines, and tires. Accordingly, it is desirable to minimize the cost and difficulties encountered in attempting to lower the chassis of vehicles having live wheel hubs.

Recent vehicles produced by General Motors (GM) such as the Chevy Colorado, among others, are provided with factory steering knuckles having a unique style of ball joint for attachment to the lower control arm of the steering assembly. Typical lower ball joints have a circular shaped housing that is pressed into a corresponding opening located in the lower control arm. However, instead of press-fitting the lower ball joint into such a hole, the Chevy Colorado ball joint, and others, are bolted or riveted directly into the lower control arm. It is therefore desirable to provide a drop spindle for use with such a unique lower ball joint assembly.

SUMMARY OF THE INVENTION

The present invention is a modified ball joint assembly for attachment to a steering knuckle made up of a body and a spacer. The body includes a ball joint at one end, a set of attachment openings at the other end, and a variably spaced segment between the ends. The spacer inserts into a void in the lower control arm of the vehicle, and includes a plurality of complementary attachment openings for use in attaching the body and the spacer to the lower control arm. The modified ball joint assembly raises the connection point of the steering knuckle relative to the lower control arm thereby lowering the ride height of a vehicle a desired amount without requiring the removal of or modification of the steering knuckle. The present invention allows the factory-supplied steering knuckle and wheels or rims to be used, providing a considerable cost savings to the end user. The ball joint assembly described herein may be used to lower the vehicle chassis on vehicles where the steering knuckles is of the large-bore "live" wheel hubs, including four-wheel drive trucks.

The present invention provides an adaptor for use with a lower ball joint assembly of a type that is bolted to the lower control arm. The invention utilizes the strength and support available from the wide spread bolt pattern of such a directly attached design to provide an extended or elongated adaptor assembly having a significant offset (vehicle lowering) distance between the ball joint connection to the steering knuckle and the connection to the lower control arm. The extended adaptor of the present invention allows the steering knuckle to be lowered relative to the lower control arm by the amount of such extension.

The factory ball joint assembly provides a direct, linear connection between the ball joint and the lower control arm, whereas the adaptor ball joint of the present invention provides a significant (vertical) offset distance between the connection to the steering knuckle and the connection to the lower control arm, such that the lower control arm is lowered by a selected distance—thereby lowering the vehicle chassis by the same distance. It is to be appreciated that a wide range of offset (lowering) distances may be provided by adaptors of the present invention, depending largely upon the desired and/or available distance within the wheel or rim.

To install the offset ball joint of the present invention requires removal of the factory ball joint by unbolting it from the lower control arm and steering knuckle. In many cases, an anti sway bar end link extends vertically from the lower control arm. The anti sway bar must be detached from the link, and the welded end of this link mount must be disconnected by cutting or sawing. This is required to create a flat mounting surface for the new ball joint adaptor.

The adaptor of the present invention is then installed to replace the factory ball joint. First, the ball joint end of the adaptor of the present invention is loosely inserted into the ball joint receptacle of the steering knuckle, and the control arm end of the ball joint adaptor is attached to the upper surface of the lower control arm. An insert may be placed into the void in the lower control arm from which the factory ball joint was removed to avoid loss of strength or deformity in the lower control arm. The control arm end of the adaptor is bolted to the top of the control arm connecting the ball joint adaptor, the lower control arm, and the spacer. Then the ball joint stud is properly attached to the steering knuckle where the stock ball joint was originally attached. Lastly (if applicable) the anti sway bar end link is attached to a specially designed receptacle provided on the adaptor which replaces the original anti-sway bar end link which was removed during assembly. The installation is simple and should only take about an hour to complete.

A significant benefit to using the offset ball joint of the present invention instead of replacing the steering knuckle with a drop spindle is that the ball joint only modifies the position of the steering knuckle in relation to the lower control arm. As a result, the user may still use the stock wheels provided with the vehicle, instead of replacing them with alternative wheels. If a drop spindle were used, the ball joint mount on the spindle would be in a lower position in relation to the center hub increasing the radial dimension, in turn making it necessary to increase the inside diameter of the wheel for clearance. Without the necessary clearance the stock wheel would no longer fit the vehicle due to the interference of the ball joint mount and the inside of the wheel. This type of design would mean the user would have to replace the stock wheels with much larger sized wheels.

It is therefore a primary object of the primary invention to provide a vehicle lowering ball joint adaptor for connecting the lower control arm to the steering knuckle.

It is also an important object of the present invention to provide an alternative process for lowering vehicles than other aftermarket products, such as drop spindles.

It is a further object of this invention to provide an aftermarket product capable of lowering vehicles with "live" wheel hub assemblies.

It is another object of the present invention to provide a product for lowering vehicles that is compatible with vehicles in which the lower ball joint is bolted or otherwise attached to the lower control arm.

It is an additional object of the present invention to provide a ball joint assembly for raising steering knuckles, where the stock steering knuckle can continue to be used, allowing for clearance to use the original tires.

It is a further object of the present invention to be capable of varied offsets to allow for different embodiments of the present invention to be used for different levels of adjustment to ride height.

Other objects of the invention will be apparent from the detailed descriptions and the claims herein.

DETAILED DESCRIPTION

Figure 1:
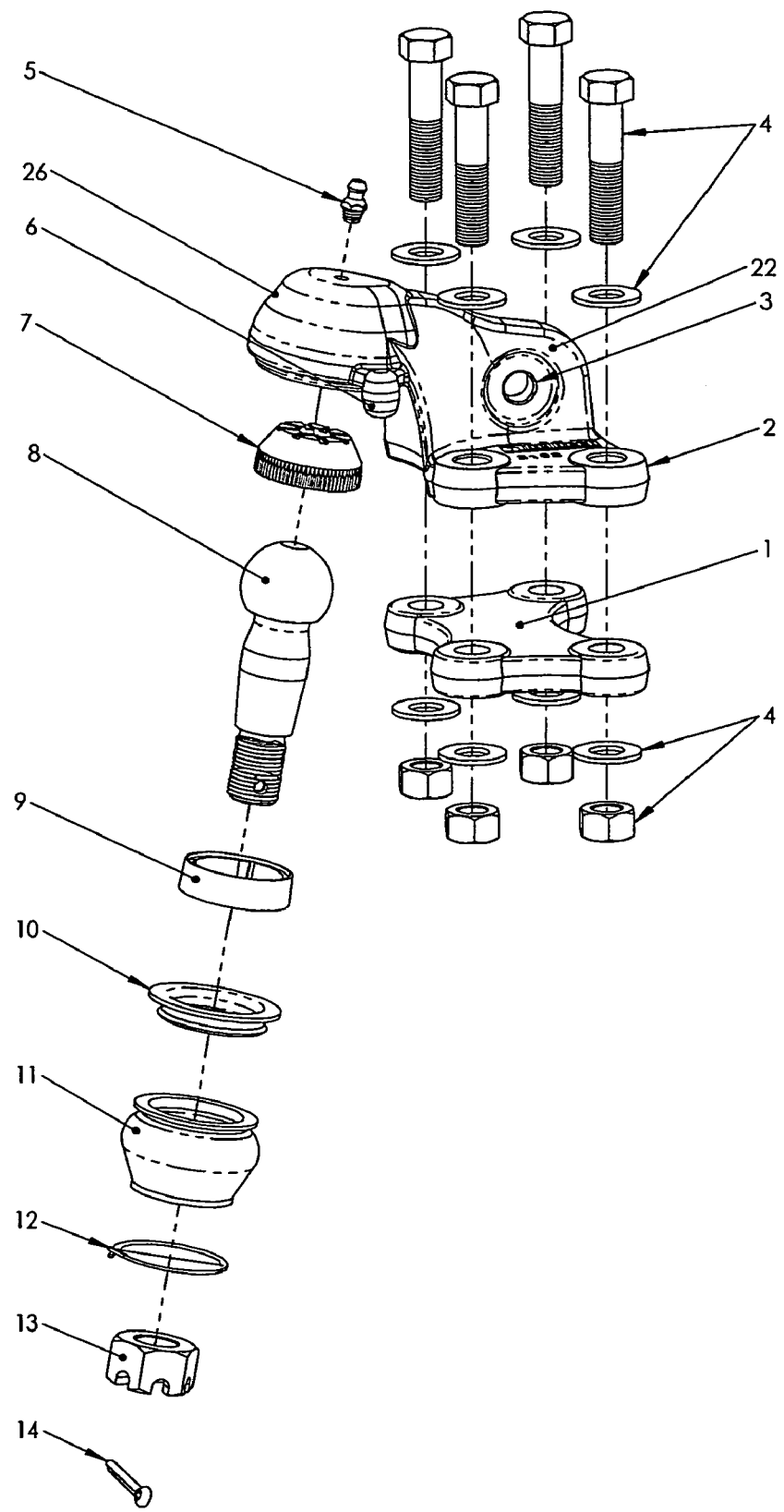
FIG. 1 is an exploded view of an offset ball joint assembly of the present invention.
Figure 2:
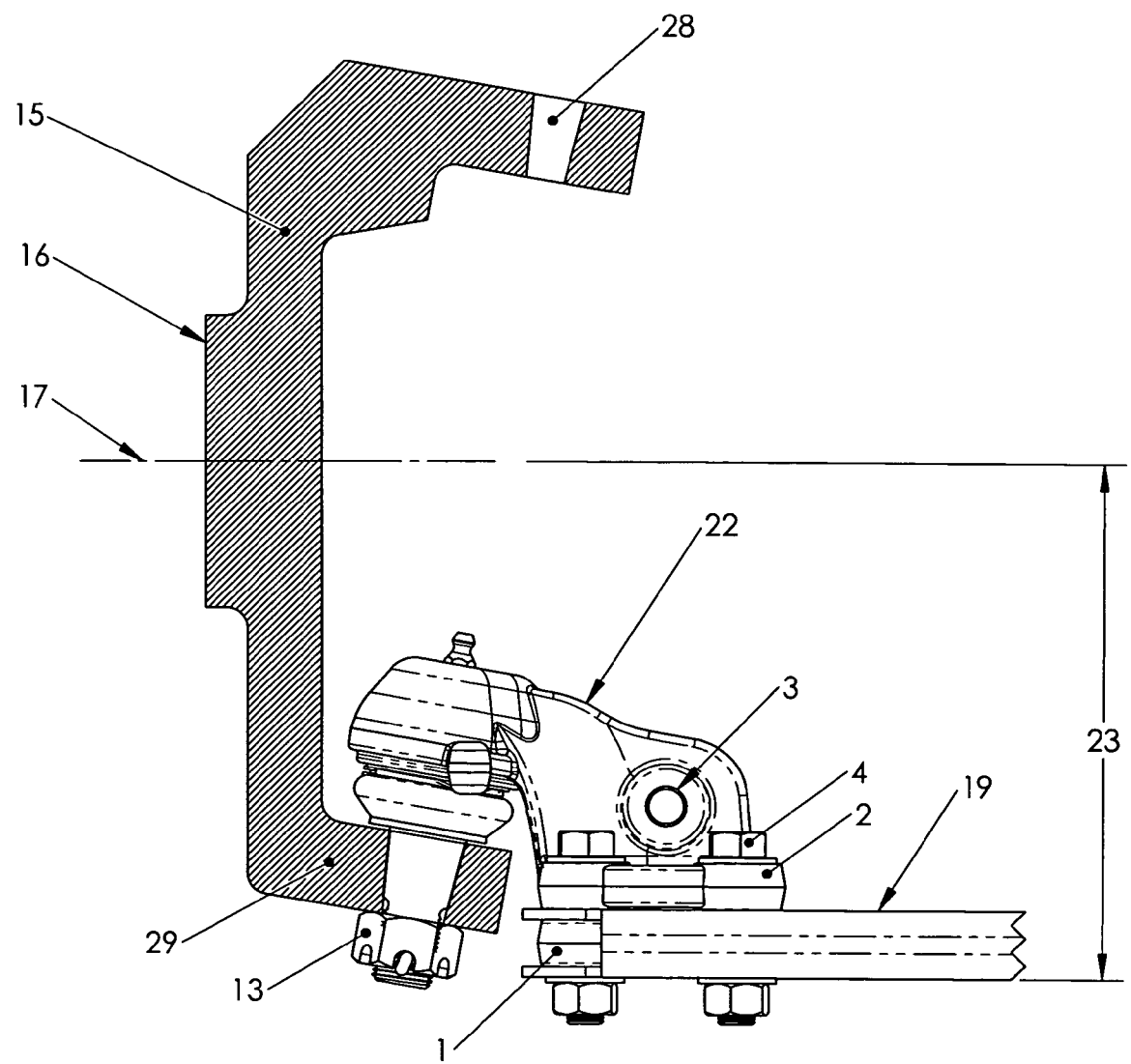
FIG. 2 is a side view of an offset ball joint assembly of the present invention installed between the lower control arm and the steering knuckle illustrating the vertical offset between the lower control arm and the center of the wheel hub.

Referring to the drawings wherein like reference characters designate like or corresponding parts throughout the several views, and referring particularly to FIGS. 1 and 2, it is seen that a typical offset ball joint of the present invention includes a sub-plate or spacer 1 which is inserted into a void the lower control arm 19 of the vehicle created by the removal of the factory ball joint 18. The spacer 1 increases the stability of the control arm 19 and prevents compression of the control arm by the fasteners 4. The lower portion 2 of the offset ball joint of the present invention is attached to the spacer 1 for firm attachment to the lower control arm. Both lower portion 2 and spacer 1 include a plurality of corresponding bolt holes for use in attachment to the lower control arm 19. A plurality of fasteners 4, such as a combination of bolts, washers, and/or nuts are used to securely fasten the lower portion 2, control arm 19, and spacer 1.

The main body 22 of the present invention is provided between the lower portion 2 and an upper cup 26 which receives the cup 7 and ball 8 of the ball joint stud. Main body 22 may be of different sizes, and provides an offset distance between the control arm 19 and the ball joint stud that is different from (i.e., greater than) the distance provided by the factory ball joint. Compare the position of control arm 19 relative to the lower boss 29 and to centerline 17 of steering knuckle 15 in FIG. 3 (factory) with the positions of these elements in FIG. 2 (using the present invention). The size of body 22 dictates the amount of offset distance between the lower control arm 19 and the steering knuckle 15. This size may vary according to the desires of the user, and is limited by such things as the available distance within the wheel or rim. A larger body 22 creates a greater offset distance; a smaller body creates a lesser offset.

Figure 3:
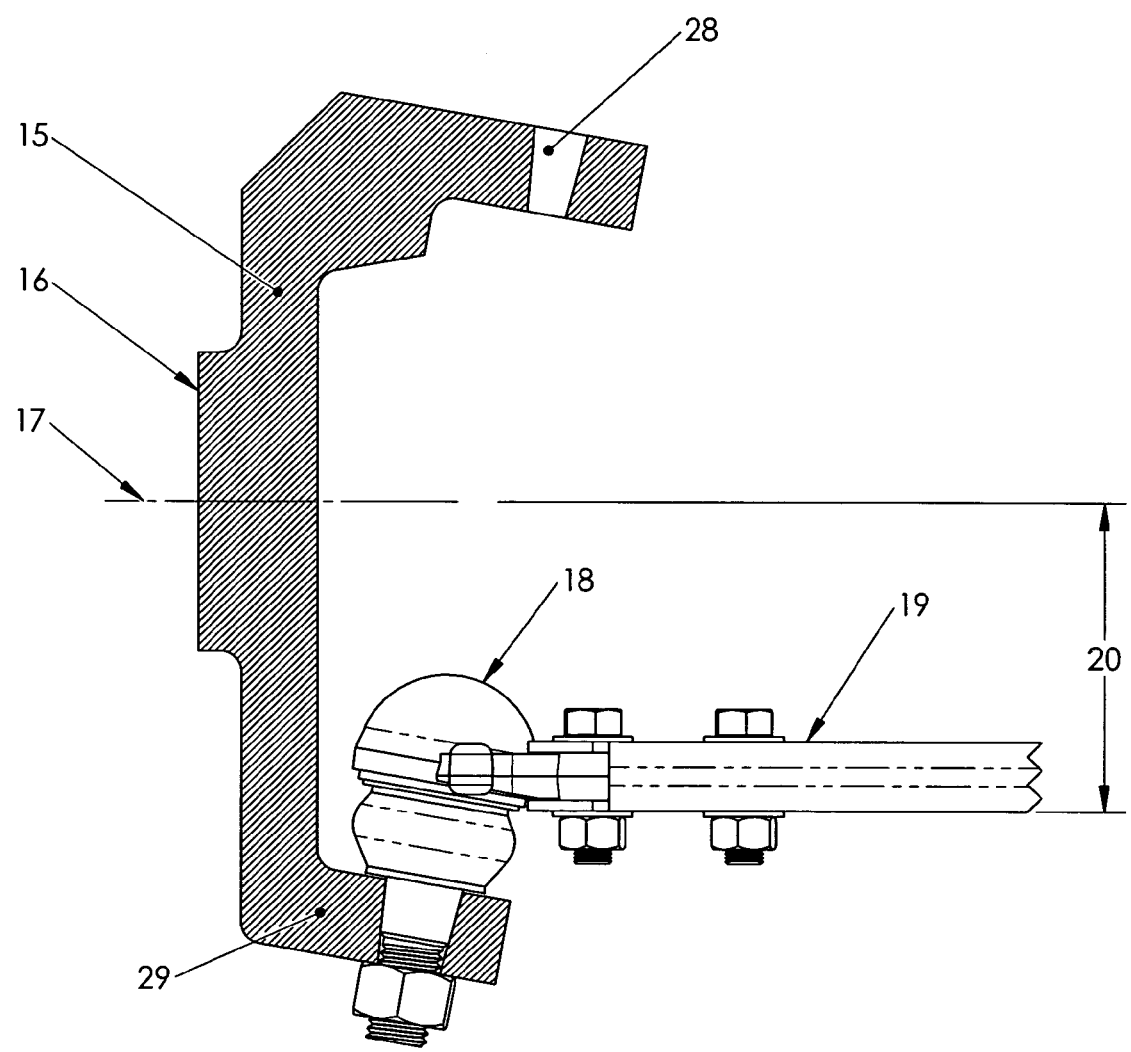
FIG. 3 is a side view of a factory (stock) ball joint installed between the lower control arm and the steering knuckle illustrating the vertical offset between the lower control arm and the center of the wheel hub.
Figure 4:
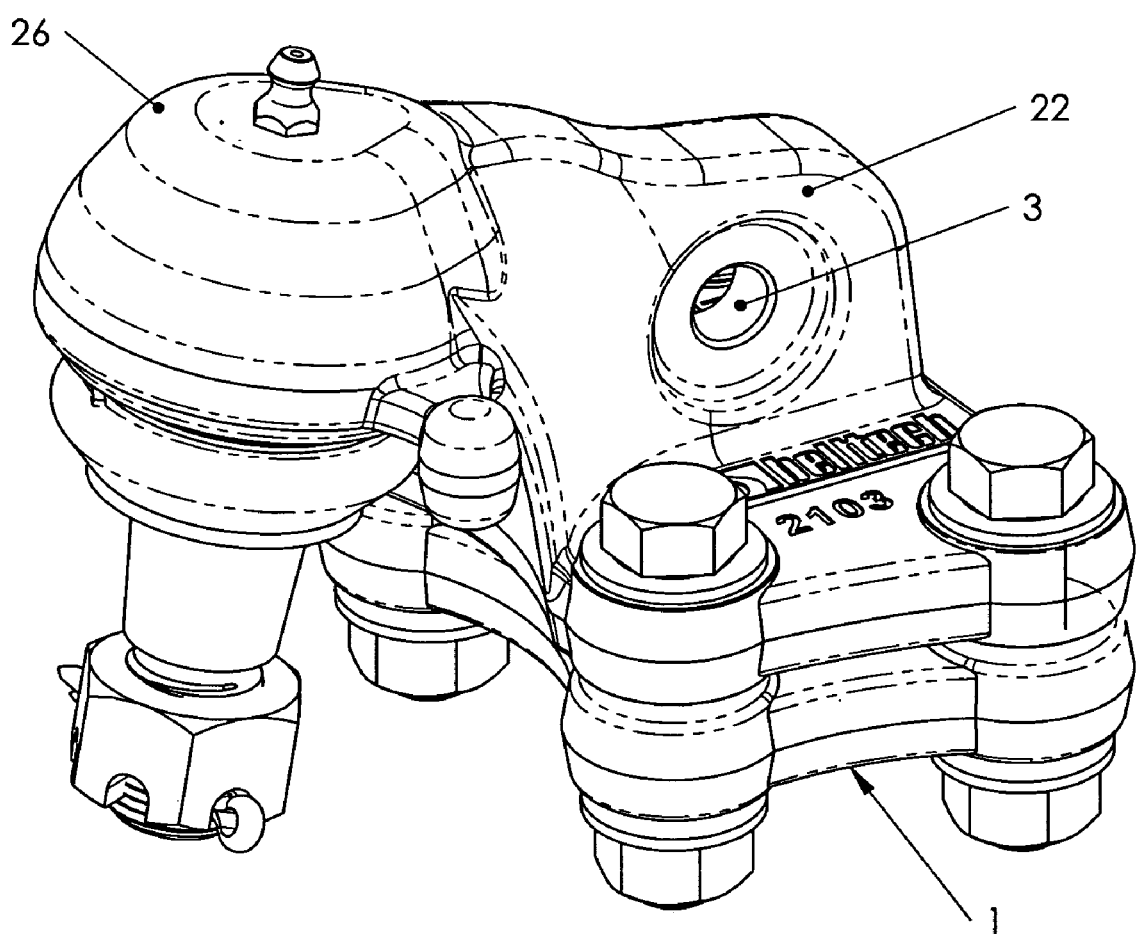
FIG. 4 is a perspective view of an assembled offset ball joint assembly of the present invention.

Referring to the exemplary embodiment of FIGS. 2 and 3, it is seen that the factory-installed stock ball joint of FIG. 3 provides a first distance 20 (e.g., about 4½" inches) between the center line of the wheel hub 17 and the end of the lower control arm 19. By replacing the factory ball joint with the present invention, an increased distance is provided as shown by second distance 23 (e.g., about 6½" inches) of FIG. 2.

Figure 5:
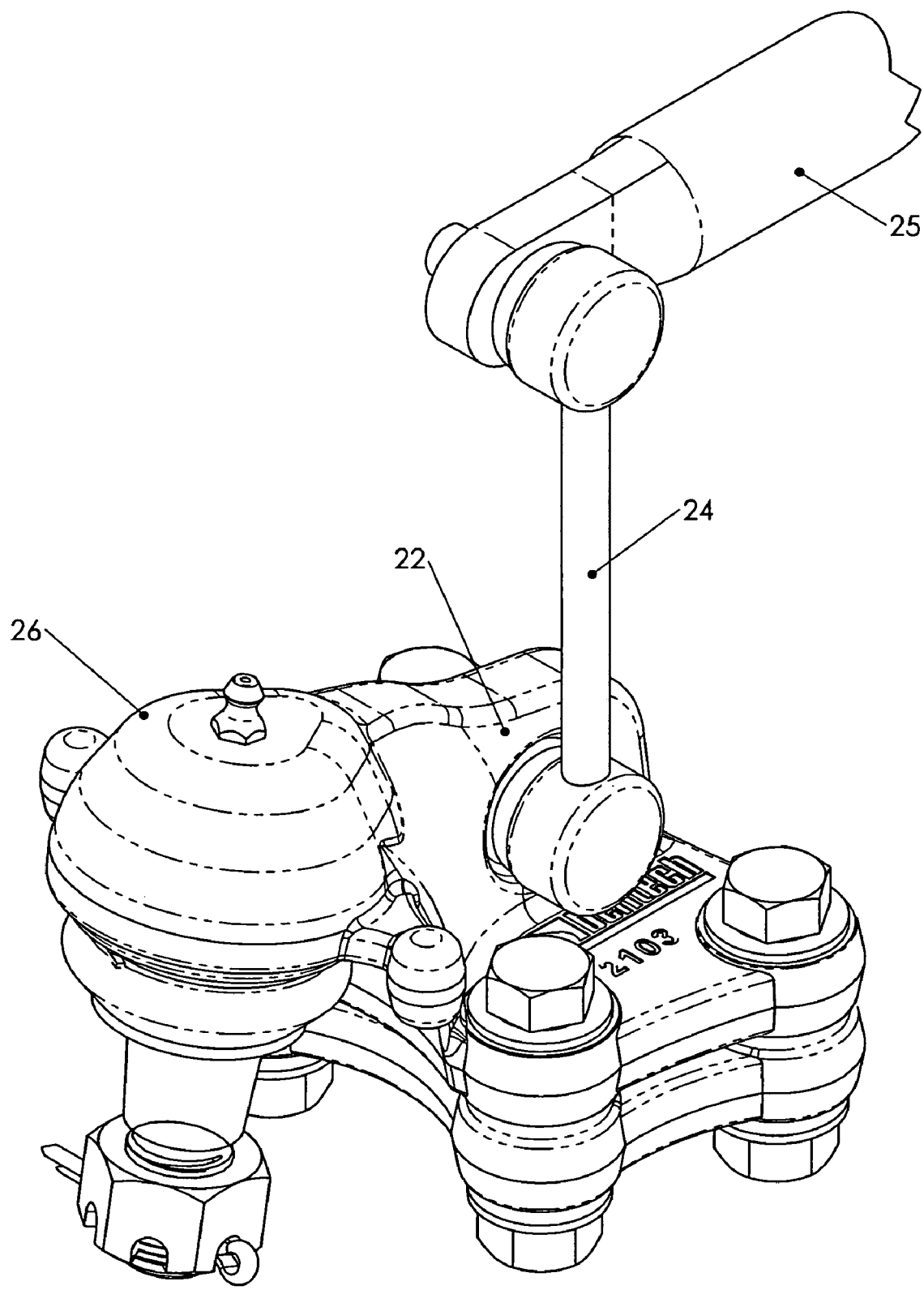
FIG. 5 is a perspective view of an assembled offset ball joint assembly of the present invention attached to an anti-sway bar.

In an alternative embodiment, a mounting location 3 is provided on the main body 2 for attachment to an anti-sway bar 24 of the vehicle, if necessary. See FIG. 5. Steering stops 6 may also be provided. These stops prevent movement of the steering knuckle to prevent over-rotation which could damage parts of the steering assembly.

The remainder of the assembly may include such typical features as a grease zerk 5, a metal ball cup 7, the ball stud 8, a retaining ring 9, a washer 10, a grease cap 11, grease cap retainer ring 12, a slotted nut 13, and a tie pin 14. The ball stud 8, metal ball cup, should be properly pressed into the main body 2. The retaining ring, 9, washer 10, grease cap and retainer ring should be properly assembled around the ball stud 8, to allow for proper lubrication to prevent wear. The orientation and angle of the ball stud should be substantially identical to the factory ball stud to ensure proper fit to the steering knuckle.

As shown in FIG. 3, steering knuckle 15 includes an upper ball joint mount 28, a lower ball joint mounting location 29 where the factory ball joint 21 has been installed, and a wheel hub mounting location 16. The factory ball joint 21 is attached to a side slot in the lower control arm 19. When the factory ball joint is removed, it may leave a void in this side slot of the lower control arm 19. Referring to FIGS. 1 and 2, it is seen that an insert 1 may be placed into this void. This provides stability to the lower control arm 19 in order to avoid loss of strength or deformity when attachment bolts are passed through the bolt openings in the upper and lower flanges of the lower control arm.

After spacer 1 is inserted, bolts 4 or other attachment means may be passed through the openings in lower section 2, the upper flange of the lower control arm, spacer 1, and the lower flange of the lower control arm. These bolts connect the ball joint main body 22, spacer 1, and lower control arm 19 together as shown in FIG. 2. The ball joint stud 8 is then connected to the steering knuckle where the factory ball joint 21 was originally connected. Finally, if necessary, the anti sway bar 24 is attached to location 3 on body 22. The result is an increase in the distance between the wheel hub centerline and the lower control arm, resulting in a lowering of the vehicle without replacement of the steering knuckle.

It is to be understood that variations and modifications of the present invention may be made without departing from the scope thereof, including different combinations of the elements identified herein. It is also to be understood that the present invention is not to be limited by the specific embodiments disclosed herein, but only in accordance with the appended claims when read in light of the foregoing specification.

What is claimed is:

1. A lower ball joint for attachment to a vehicle steering knuckle to lower the position of a lower control arm relative to a wheel hub opening of said steering knuckle comprising an adaptor having a ball joint at one end and at least one attachment opening at the opposite end, and a segment between said ends defining the amount by which said lower control arm is lowered, and a spacer for insertion into a void in the lower control arm created by removal of a factory ball joint, said spacer having at least one complementary attachment opening for use in attachment to said adaptor.

2. A ball joint assembly for attachment between a vehicle steering knuckle and a lower control arm comprising:
  a. a body member having a ball joint at one end, a plurality of attachment openings at an opposite end, and a segment between said ends; and
  b. a spacer for insertion into a void in the lower control arm, said spacer having at least one opening for use in attaching said body member and said spacer to said lower control arm such that the position of said lower control arm is changed relative to a wheel hub opening of said steering knuckle.

3. The assembly of claim 2 wherein the distance between a centerline of said wheel hub opening and said lower control arm is increased by about the size of said segment.

4. The assembly of claim 3 where a plurality of fasteners are provided for threading through the attachment openings of the body, the openings of the lower control arm, and the complementary openings in the spacer for secure attachment of the modified ball joint assembly to the lower control arm.

5. The modified ball joint assembly of claim 2 wherein an opening is provided in said segment for receiving one end of an anti-sway bar.

6. The modified lower ball joint assembly of claim 5 where at least one steering stop is attached to the lower ball joint assembly.

7. A modified ball joint assembly comprising a ball joint main body having a ball joint at one end, and a plurality of attachment openings at an opposite end for receiving a plurality of fasteners for attaching said opposite end to a lower control arm, said body having a central segment for increasing the vertical distance between said lower control arm and a central wheel hub opening of a steering knuckle over the distance provided by a factory ball joint assembly.

8. A modified ball joint assembly comprising a ball joint main body having a central segment for increasing the distance between a lower control arm and a central wheel hub opening of a steering knuckle over the distance provided by a factory ball joint assembly; a ball joint attached to one end of said main body; and a plurality of attachment openings at the other end of said main body for receiving a plurality of fasteners for attaching said body to said lower control arm wherein a spacer is provided that fits into the lower control arm, said spacer having a plurality of openings corresponding to the attachment openings of said main body.

9. The modified ball joint assembly of claim 8 wherein said main body attaches to an upper surface of said lower control arm.

10. The modified ball joint assembly of claim 8 further comprising a plurality of fasteners threaded through the attachment openings of the ball joint main body, the lower control arm, and the corresponding openings in the spacer for secure attachment of the modified ball joint assembly to the lower control arm.

11. The modified lower ball joint assembly of claim 8 wherein the segment contains an attachment opening for receiving one end of an anti-sway bar.

12. The modified lower ball joint assembly of claim 11 wherein at least one steering stop is attached to the lower ball joint assembly.

13. A modified ball joint assembly for lowering the vertical height of a vehicle by lowering a lower control arm relative to a wheel hub opening in a steering knuckle of said vehicle comprising a ball joint for connection with a lower ball joint mount of said steering knuckle, a central body attached to said ball joint comprising a segment providing a desired offset between said wheel hub opening and said lower control arm, at least one opening in said central body for attachment to said lower control arm, an opening in said segment for receiving one end of an anti-sway bar, and a spacer for insertion into a void in the lower control arm, said spacer containing at least one opening corresponding to the at least one opening of the central body.

14. The modified lower ball joint assembly of claim 13 where said central body attaches to an upper surface of said lower control arm.

15. The modified lower ball joint assembly of claim 14 further comprising a plurality of fasteners threaded through the attachment openings of the central body, the lower control arm, and the spacer for secure attachment of the modified ball joint assembly to the lower control arm.

16. The modified lower ball joint assembly of claim 15 where a plurality of steering stops are attached to the central body.

17. A method for lowering the height of a vehicle comprising the steps of:

a. detaching a factory lower ball joint from a lower ball joint mount of a steering knuckle;

b. detaching a lower control arm from the factory lower ball joint;

c. inserting a spacer into a void in the lower control arm created by the removal of the factory lower ball joint;

d. attaching one end of a modified ball joint assembly to the lower control arm, said modified assembly comprising an adaptor comprising a ball joint at one end, a plurality of attachment openings at the opposite end, and a segment between said ends; and e. attaching the other end of the modified ball joint assembly to the lower ball joint mount of the steering knuckle.

18. The method of claim 17 comprising the additional steps of:

f. detaching an anti-sway bar from the lower control arm prior to attachment of the modified ball joint assembly; and g. attaching the anti-sway bar to an anti sway bar mount on said modified ball joint assembly.

19. A modified ball joint assembly for lowering the vertical height of a vehicle by lowering a lower control arm relative to a wheel hub opening in a steering knuckle of said vehicle comprising an adaptor having a ball joint at one end for connection with a lower ball joint mount of said steering knuckle, at least one opening at an opposite end of said adaptor for attachment to a lower control arm, a body between said ends providing a vertical offset between said wheel hub opening and said lower control arm, and an opening in said body for receiving one end of an anti-sway bar.

* * * * *